A. J. HADERT.
PACKAGE WRAPPER.
APPLICATION FILED JULY 5, 1912. RENEWED MAY 25, 1916.
1,235,312.
Patented July 31, 1917.
15 SHEETS—SHEET 1.
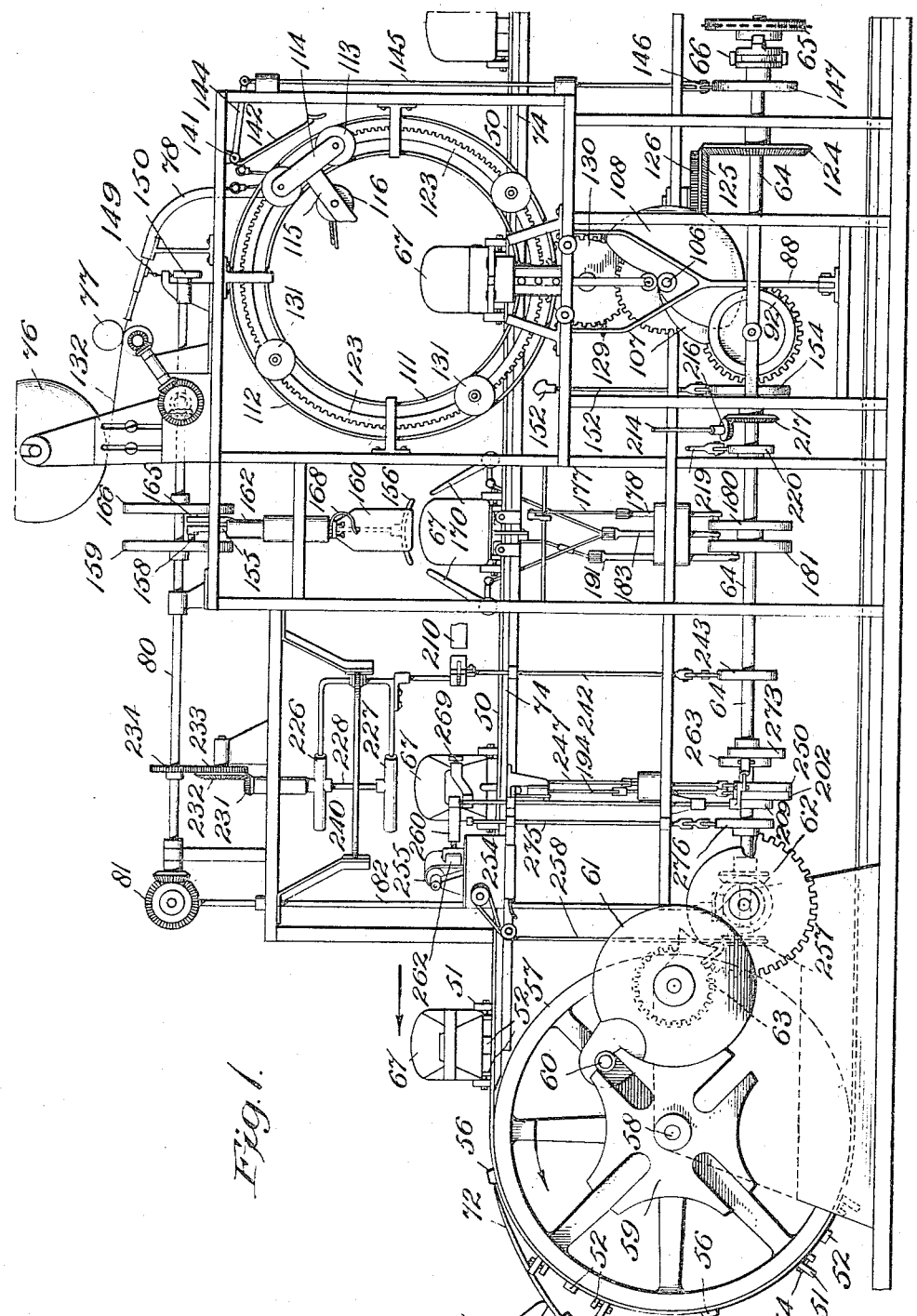
Fig. 1.

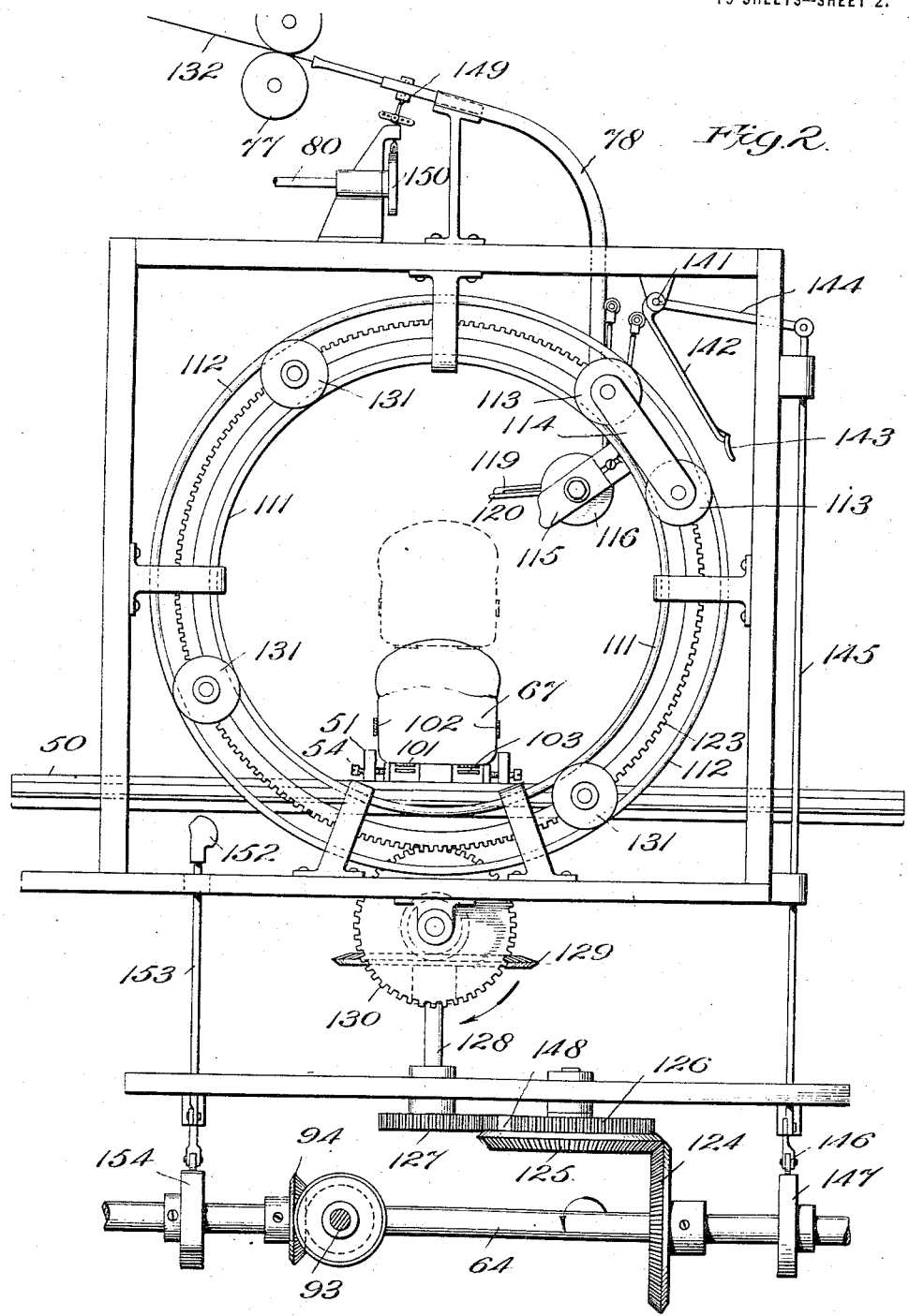

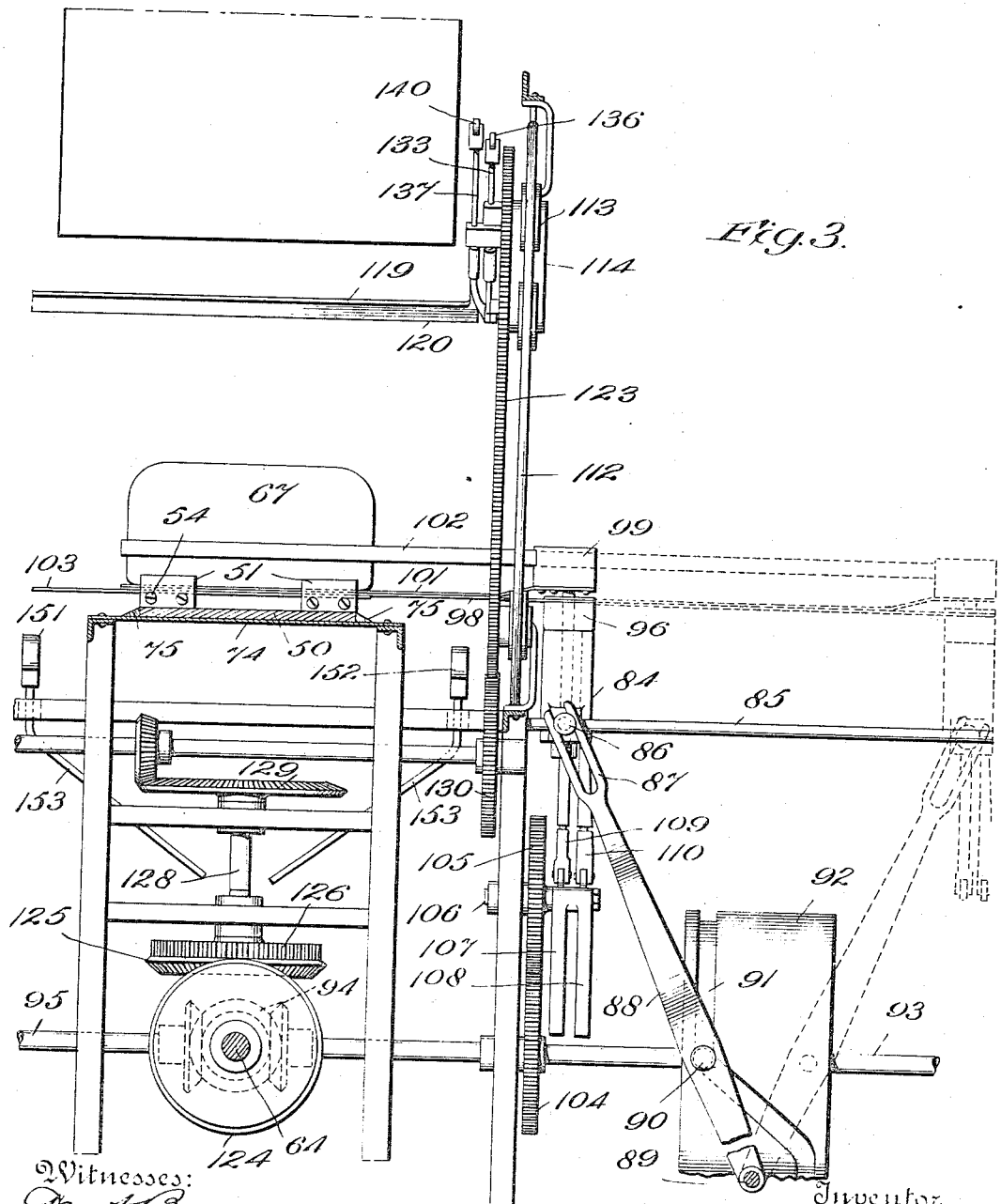

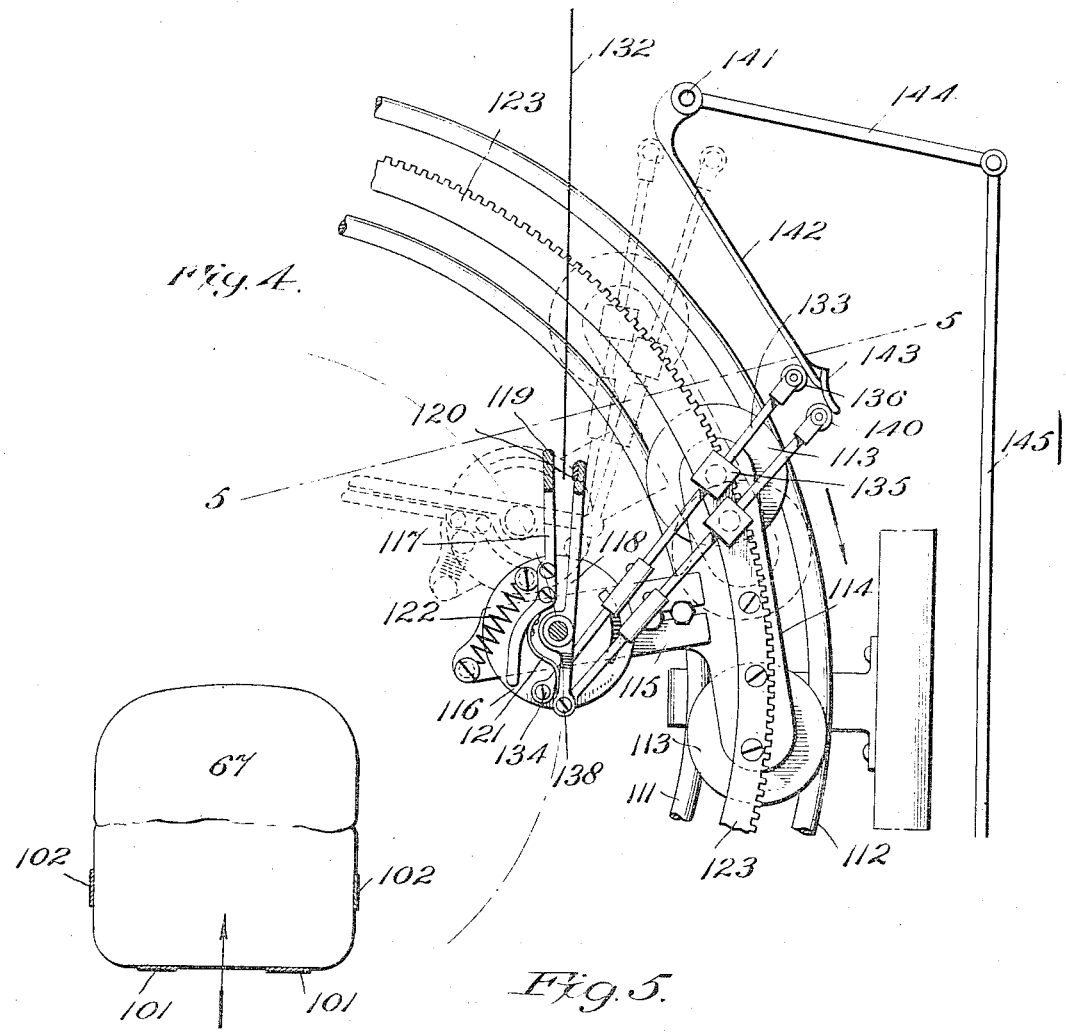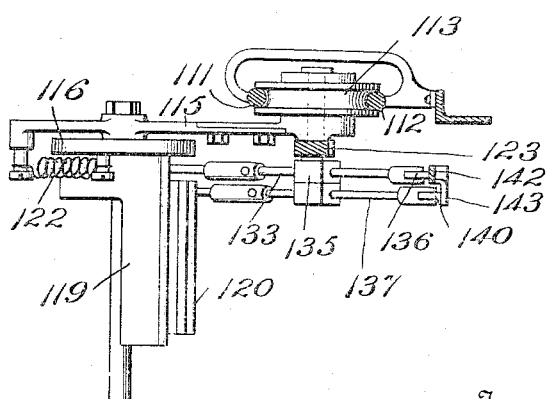

A. J. HADERT.
PACKAGE WRAPPER.
APPLICATION FILED JULY 5, 1912. RENEWED MAY 25, 1916.
1,235,312.  Patented July 31, 1917.
15 SHEETS—SHEET 5.
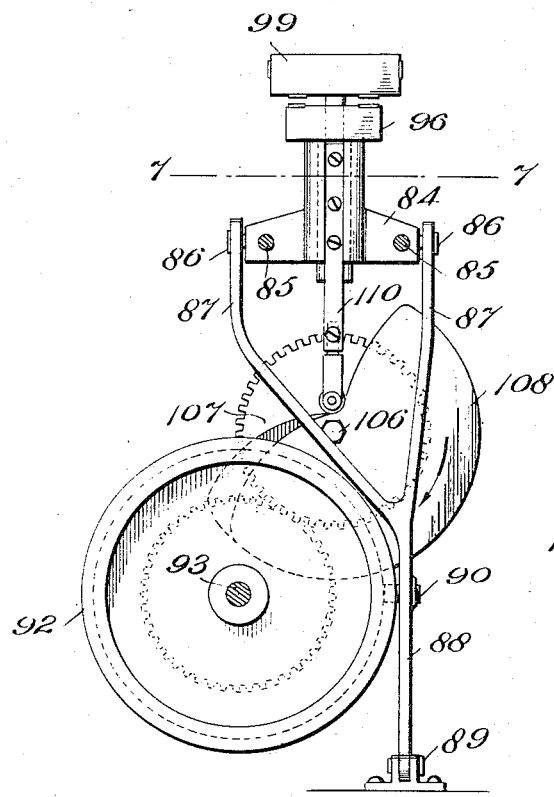
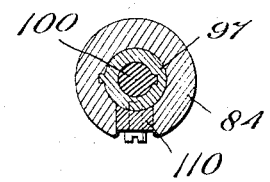
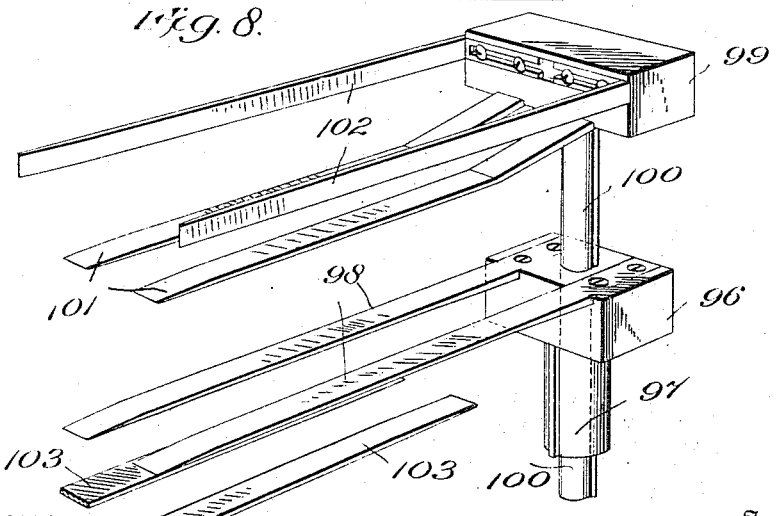
Inventor
Albert J. Hadert,
By his Attorneys
Wilkinson, Witherspoon and Mackaye A. J. HADERT.
PACKAGE WRAPPER.
APPLICATION FILED JULY 5, 1912. RENEWED MAY 25, 1916.
1,235,312. Patented July 31, 1917.
15 SHEETS—SHEET 6.
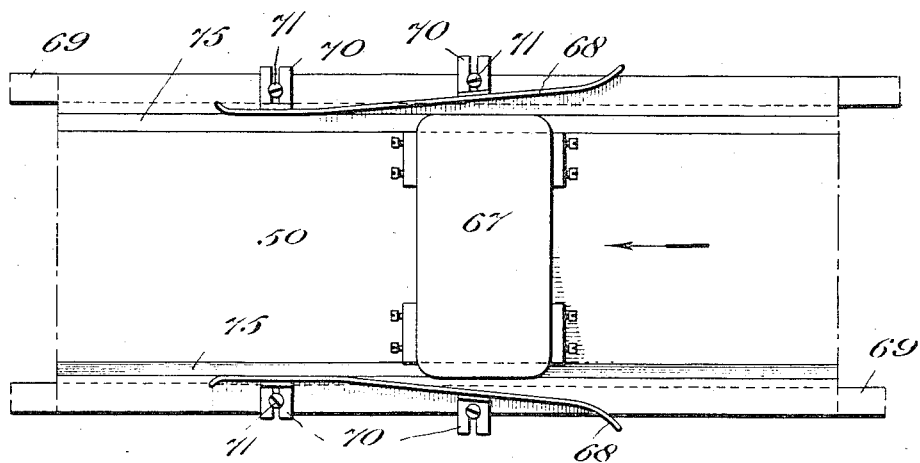
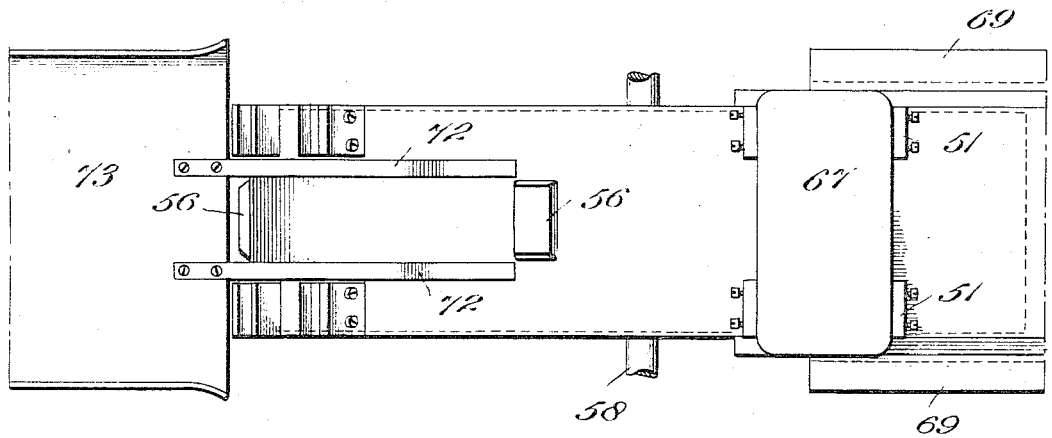

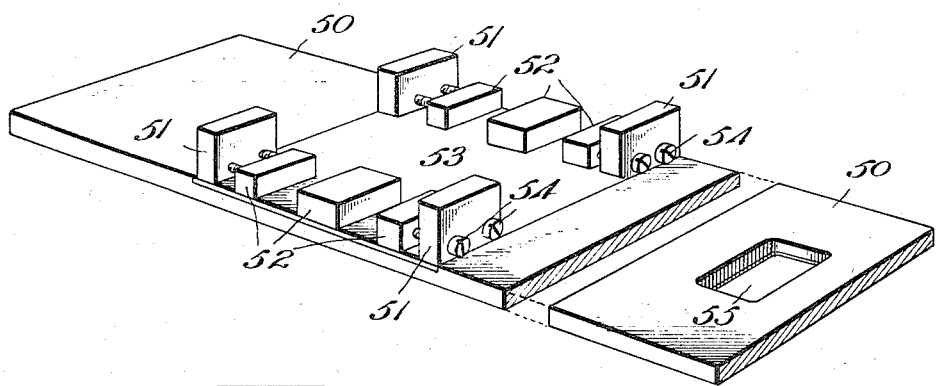
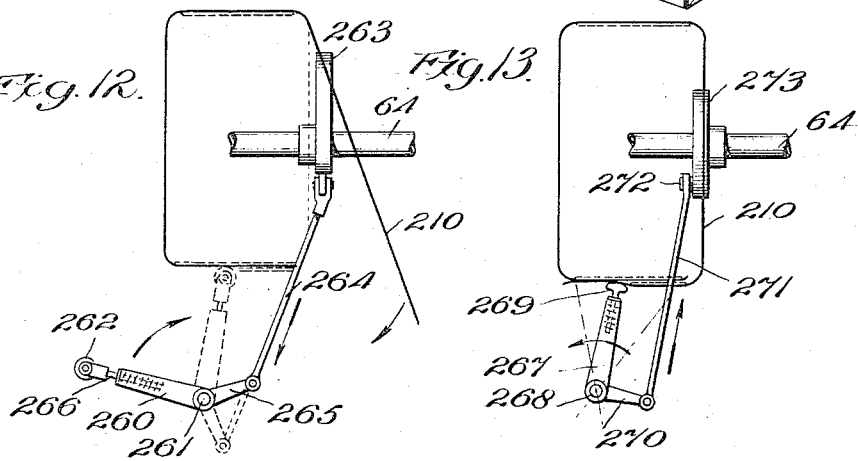
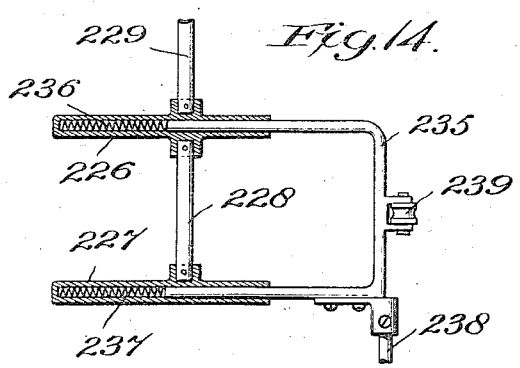

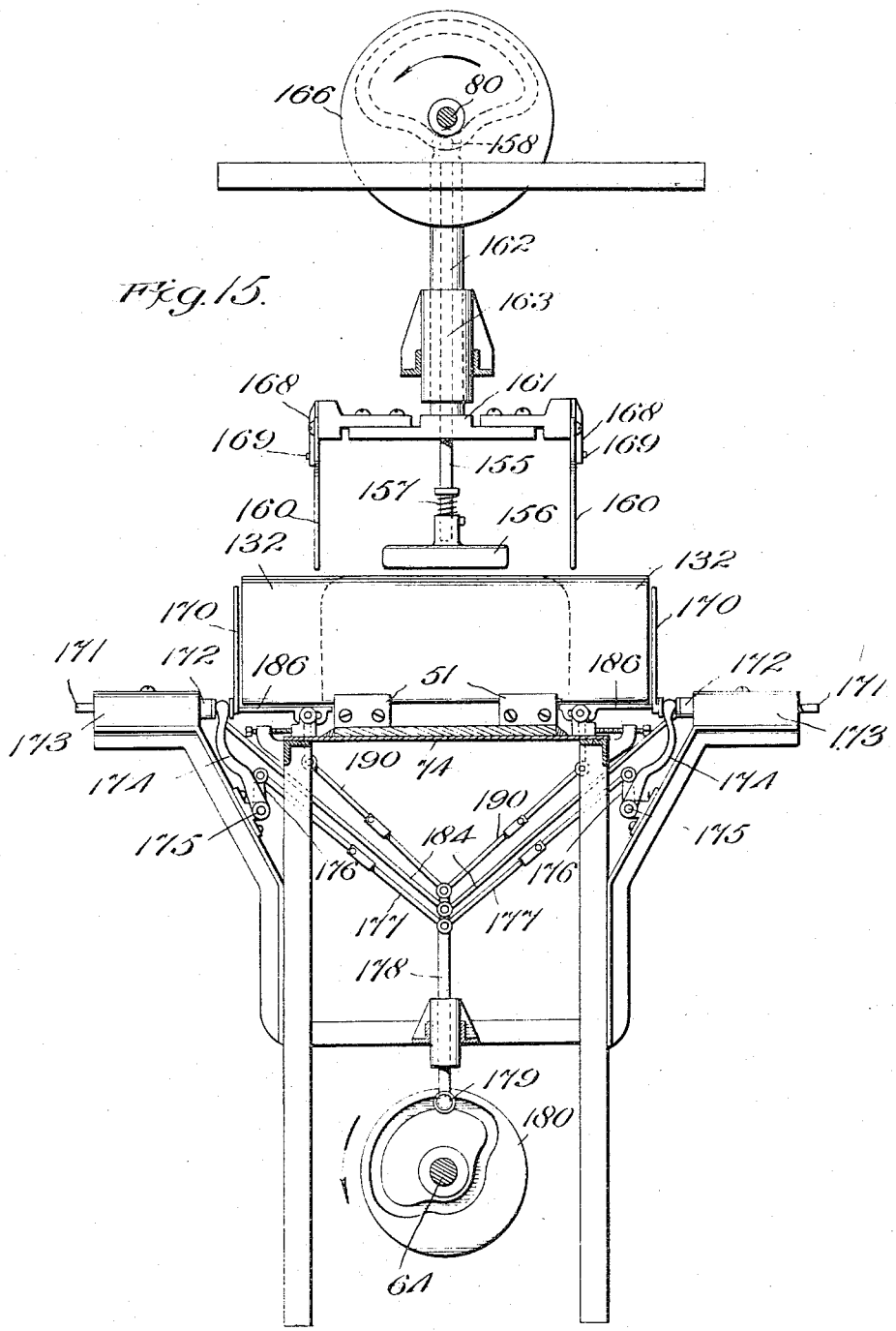

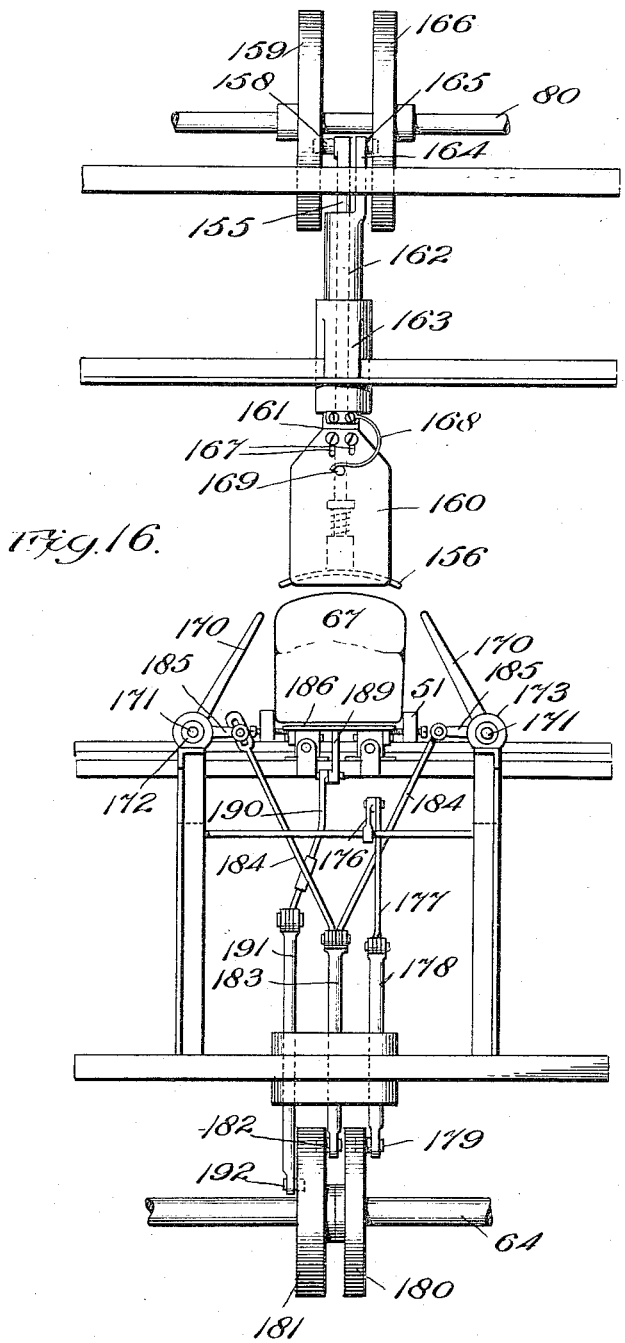

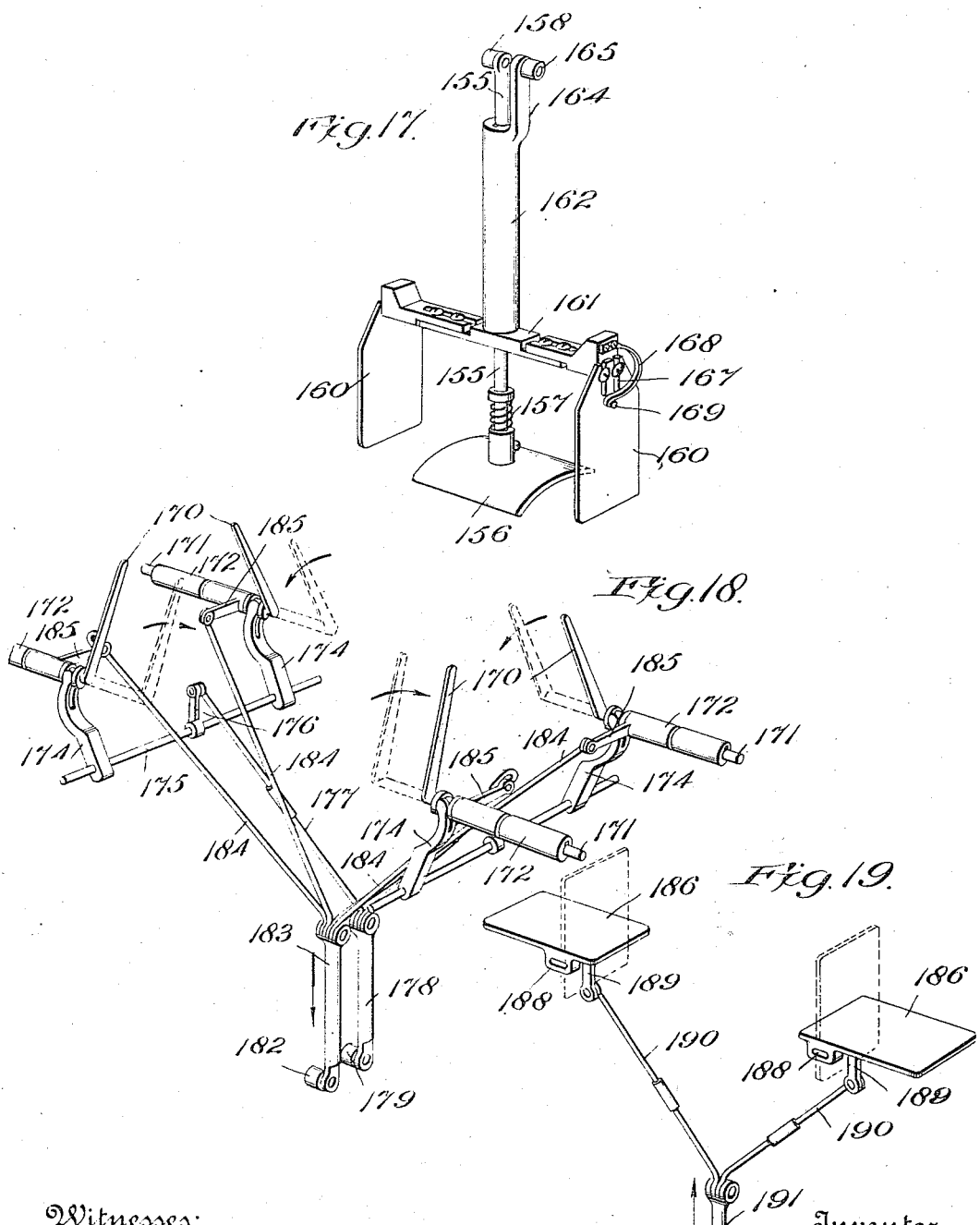

A. J. HADERT.
PACKAGE WRAPPER.
APPLICATION FILED JULY 5, 1912. RENEWED MAY 25, 1916.
1,235,312.
Patented July 31, 1917.
15 SHEETS—SHEET 11.
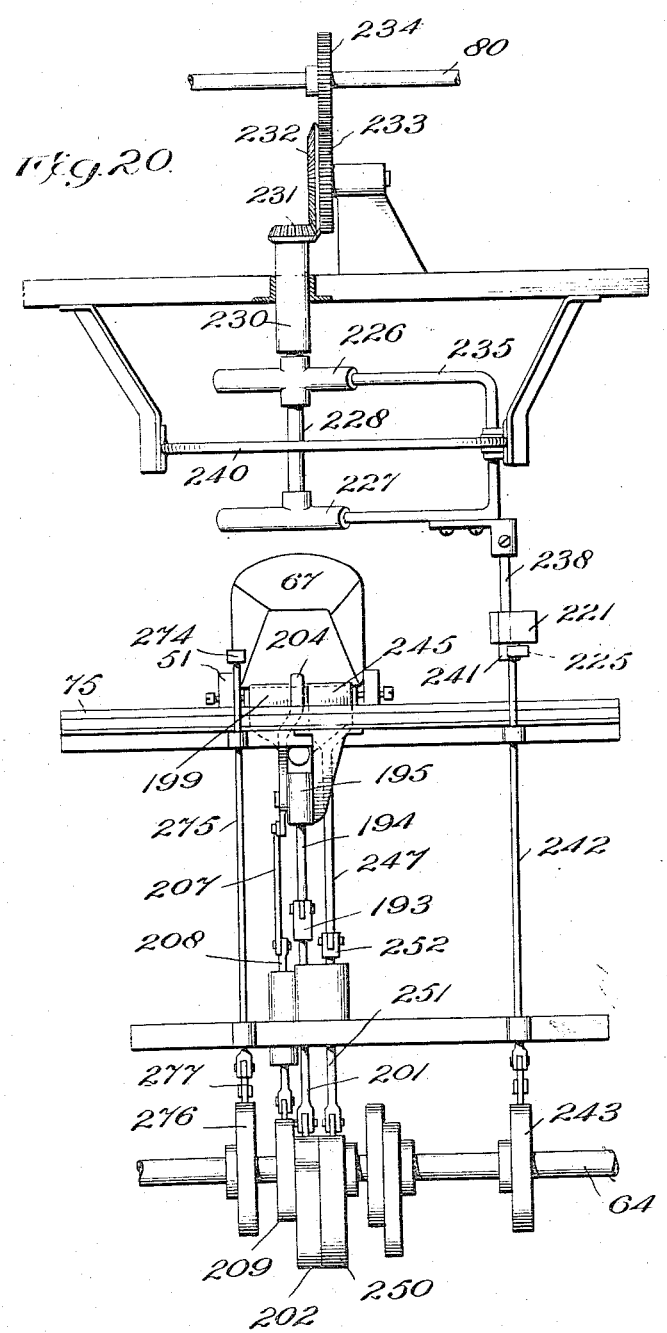

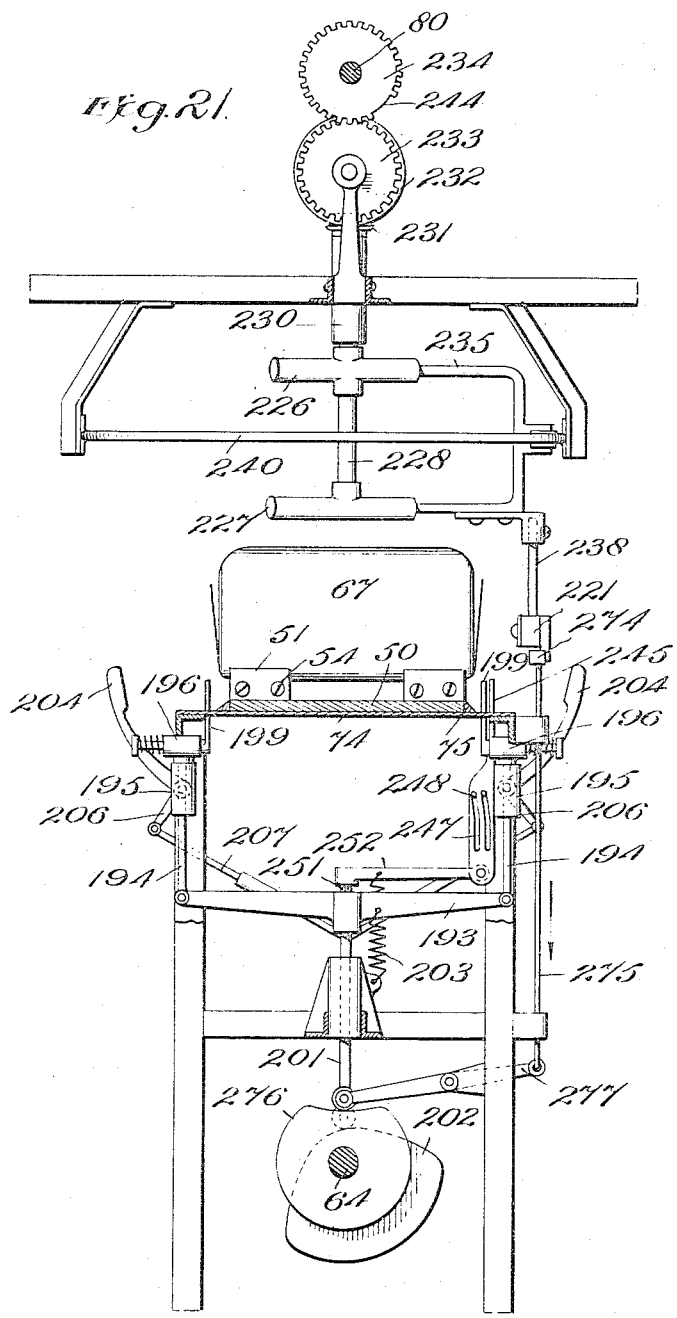

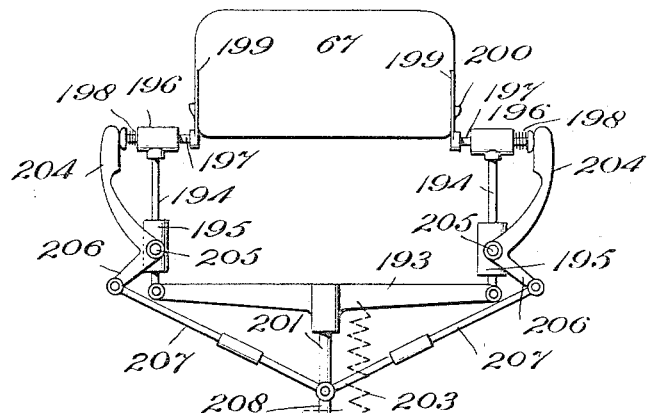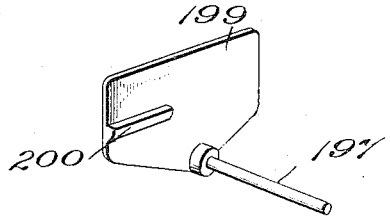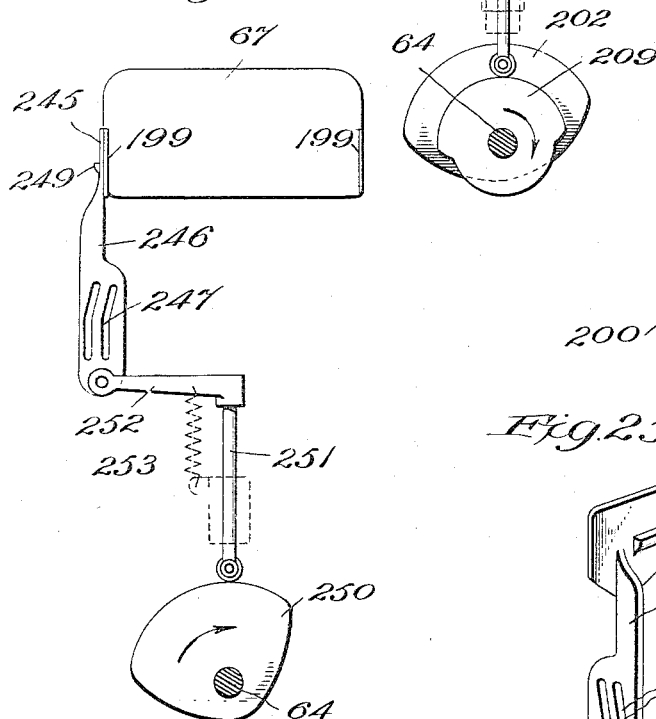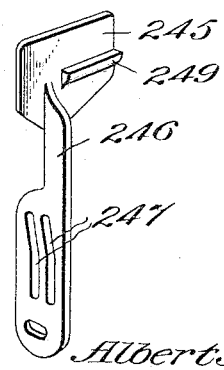

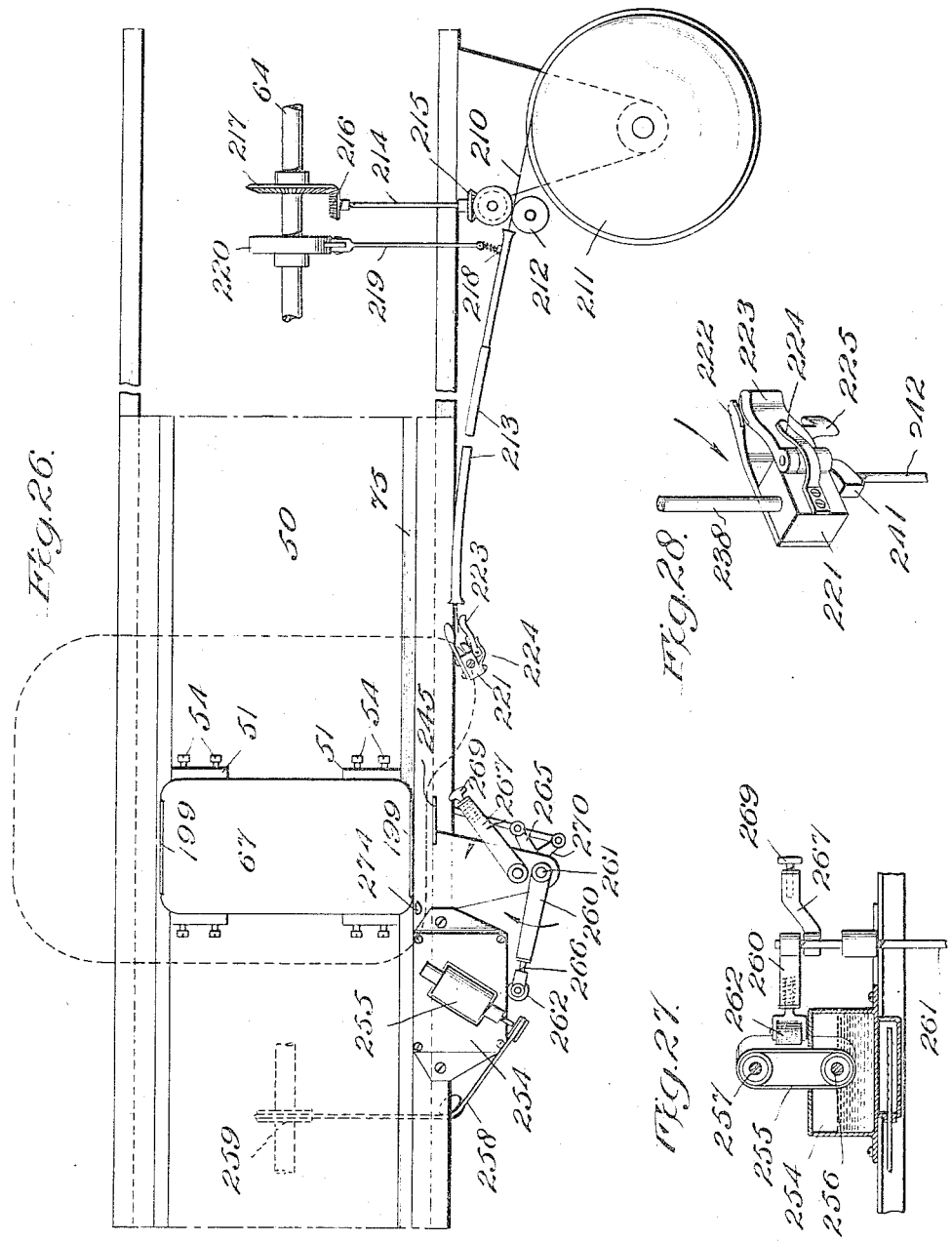

A. J. HADERT.
PACKAGE WRAPPER.
APPLICATION FILED JULY 5, 1912. RENEWED MAY 25, 1916.
1,235,312.
Patented July 31, 1917.
15 SHEETS—SHEET 15.
 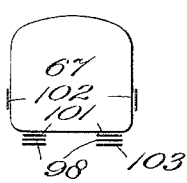 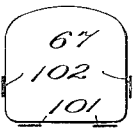 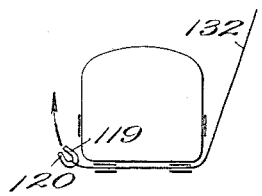
Fig. 29. Fig. 30. Fig. 31. Fig. 32.
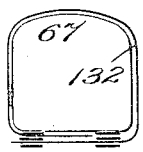  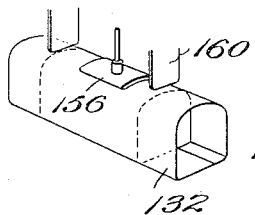 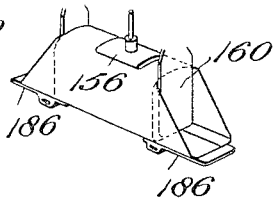
Fig. 33. Fig. 34. Fig. 35. Fig. 36.
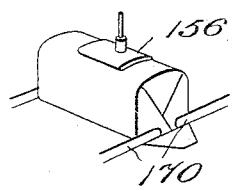 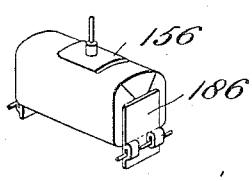 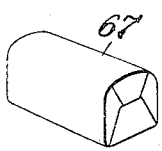 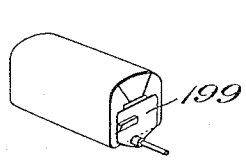
Fig. 37. Fig. 38. Fig. 39. Fig. 40.
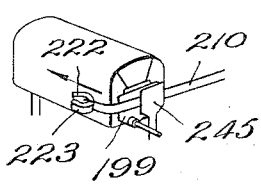 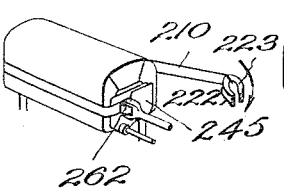 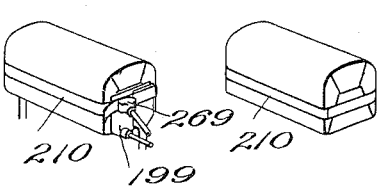
Fig. 41. Fig. 42. Fig. 43. Fig. 44.
Witnesses:
Inventor
Albert J. Hadert,
By his Attorneys
Wilkinson, Witherspoon and MacKaye

UNITED STATES PATENT OFFICE.

ALBERT J. HADERT, OF NEW ROCHELLE, NEW YORK.

PACKAGE-WRAPPER.

1,235,312.  Specification of Letters Patent.  Patented July 31, 1917.

Application filed July 5, 1912, Serial No. 707,940. Renewed May 25, 1916. Serial No. 99,909.

*To all whom it may concern:*

Be it known that I, ALBERT J. HADERT, a citizen of the United States, residing at New Rochelle, in the State of New York, have invented certain new and useful Improvements in Package-Wrappers; and I do hereby declare the following to be a full, clear, and exact description of the invention, such as will enable others skilled in the art to which it appertains to make and use the same.

My present invention has relation to a machine for wrapping articles of any suitable nature, and, in the preferred form shown, the invention is particularly adapted for use, on the one hand, for wrapping loaves of bread, and on the other hand, for wrapping such articles as it is desired to keep always right side up. While I have mentioned paper, throughout this specification, as the material which is used for wrapping the loaves or other articles, it is to be understood that my machine may employ any appropriate material in this connection.

The invention, viewed most broadly comprises the combination of three essential main units connected by appropriate automatic mechanism for coöperative movement; by which I mean such movements in the units respectively as by their natures and mutually related timing will serve to cause all three to act consistently together in producing the finished wrapping of the loaf of bread or other article.

The relative positions of the three elements, each as a whole, is not material to the present invention, nor do I confine myself in my broadest claims to any particular system whereby the units are made to act in the proper order. I prefer, however, to place the three units in a row or series, and to employ a "package conveyer" to carry the loaf or other article to the different units in the order desired and to carry it away when wrapped and secured.

The three units in question may appropriately and respectively be called the "paper-applying unit", the "folding unit" and the "binding unit". In the preferred form of my machine these are supplemented by a fourth unit which may be called the "package conveyer". It is also clear that, when it is not intended to bind the package, the paper applying unit may be combined with the paper folding unit alone.

Each of three main units comprises certain combinations and sub-combinations of secondary units more or less essential to the invention; and, in the following specification, I have assigned to each of these a distinctive name. It will be understood that, where each of these names is employed in my claims, it is intended to cover, not merely the device shown and described herein under that name, but the substantial equivalent thereof as a whole.

It is one advantage of my invention that all the various parts can be made adjustable so as to make a given machine easily convertible for wrapping packages of different sizes.

A preferred embodiment of my invention is shown by way of example in the accompanying drawings, wherein Figure 1 is a side elevation of the principal parts of the entire machine, Fig. 2 is a side elevation of the paper-applying unit omitting certain features for clearness, Fig. 3 is an end elevation of the paper-applying unit, Fig. 4 is a side view of the principal movable elements of the paper conveyer, showing its relation to the article to be wrapped, Fig. 5 is a plan view of the same, Fig. 6 is a side view of the shifter for the package lifter and paper adjuster, Fig. 7 is a sectional view on the line 7—7 in Fig. 6, Fig. 8 is a perspective view of one position of the lifting cradle and tension blades, Fig. 9 is a plan view of the entrance end of the package conveyer, showing a loaf ready to be carried in and wrapped, Fig. 10 is a similar view of the exit end of the conveyer, Fig. 11 is a perspective view of certain portions of the conveyer belt, Figs. 12 and 13 show in plan certain portions of the gumming device in the binding unit, Fig. 14, shows the traveling frame for the ribbon conveyer, partly in elevation and partly in section, Fig. 15 is an end elevation of the folding unit, Fig. 16 is a side elevation of the same, Fig. 17 is a perspective view of the combined steadying device and initial folding blades, Fig. 18 is a similar view of the side folding mechanism, Fig. 19 is a similar view of the final folding mechanism, Fig. 20 is a side elevation of the principal elements of the binding unit, Fig. 21 is an end elevation of the same, Fig. 22 is a similar view of the compressing mechanism, Fig. 23 is a similar view of one of the ribbon securing mechanisms, Fig. 24 is a perspective view of the compressing plate and shaft, Fig. 25 is a perspective view of a ribbon securing plate with its lifting stem, Fig. 26 is a plan view of the ribbon supplying means and gumming device, Fig. 27 is a partly sectional view of the gumming device, Fig. 28 is a perspective of the ribbon gripper, and Figs. 29 to 44 are diagrams illustrating the behavior of the machine in successive phases of action.

It is to be understood that the proportions of parts, the precise forms and positions of cams and like details as actually shown in the drawings hereto attached, are not intended as precise guides to a builder; since these are features which are within the province of those skilled in the machinist's art. The drawings merely illustrate the principles of my invention in its various aspects, and in connection with a preferred embodiment of those principles.

Inasmuch as the preferred form of my machine which is illustrated herein employs the three essential units in a row in combination with a preferred main unit which I have called the "package conveyer," it will be convenient to describe this last named unit as a preliminary to discussing the others.

The package conveyer in its preferred form consists of three essential secondary units, which may or may not be combined with certain other preferred devices. These are the endless belt, the belt support, and the intermittent driver. The term "intermittent," as applied to the last named secondary unit is to be understood as covering means for producing effective movements separated by intervals during which the belt is either made to move very slowly indeed, or, as preferred, is maintained stationary.

The "endless belt" comprises the belt proper, or equivalent chains or the like, in combination with appropriate "package holders" on said belt. In the form shown, the belt, shown at 50, is furnished at suitable intervals with package holders composed of centering blocks best shown in Fig. 11, at 51, and of lifting blocks 52, suitably separated for a purpose hereinafter explained. The blocks in question are preferably mounted upon a flexible metallic base 53, fixed upon the belt 50. I also prefer to provide screws 54, or equivalent devices, for adjusting the positions of the centering blocks.

The belt 50 is provided with openings 55, so spaced as to be engaged by driving teeth 56 on the carrying drums 57, constituting a part of the intermittent driver. Only the drum at one end of the belt is shown in the drawings. In order to move the package to each essential main unit in turn and to permit it to pause long enough within the scope of each to permit each to carry out its function, the drum 57 is driven intermittently.

For this purpose I prefer to mount upon the shaft 58 of the drum, a "Geneva stop" wheel 59. Driven in a well known manner by the pin 60 on an extension of the disk 61. This disk is driven by the broken gears 62 and 63, driven in turn, as shown, by the main driving shaft 64, so that the pin 60 makes an entire revolution during one half the time of a main shaft revolution and remains stationary during the other half of the time. The gears 62, 63 are so proportioned that the pin 60 has double the angular rate of revolution of the main shaft; and, since the forward movement of the wheel 59 and drum 57 is accomplished during a quarter revolution of the pin 60, it follows that each interval of belt movement corresponds to one eighth of the time taken for one turn of the main shaft 64. The arrows in Fig. 1 show the direction of movement of parts.

The main shaft 64 is driven, for instance by a sprocket wheel 65 through a clutch 66.

The loaf or other article 67, having been placed upon the lifting blocks 52, and centered or confined between the blocks 51, moves inward toward the paper-applying unit, in the direction of the arrow in Fig. 9. The transverse position of the article 67 is automatically adjusted by the adjusting rails 68 which can be accurately placed upon the machine frame 69 by means of the slotted brackets 70 and screws 71.

In order to remove the package from the conveyer, after wrapping, package receiving blades 72, or equivalent bridging means, are supplied, extending from the level of the belt near the top of the drum 57 to the delivery chute 73 (see Figs. 1 and 10).

In order to steady the article being wrapped upon the flexible belt, I provide a "belt-support," which, in the preferred form shown comprises a smooth metallic table 74, preferably provided with belt guides in the form of suitable longitudinal ridges 75 so placed on the table as to press lightly upon the two edges of the belt 50.

The first essential main unit to which the article 67 is brought is the paper-applying unit, the preferred form of which is best illustrated in Figs. 1 to 8 inclusive. This unit comprises four essential secondary units which may or may not be combined with certain preferred adjuncts. These essential secondary units are the "paper feeding" means, the "paper conveyer," the "package lifter" and the "paper adjuster."

The particular construction of the paper feeding means forms no part of this invention as it is a familiar organization of parts in a variety of devices, notably printing presses. The paper is fed from a roll 76 of suitable width, adjustably placed at the top of the machine, as indicated in Fig. 1. The feeding rolls 77, push the paper forward into the delivery chute 78, at the extremity of which it is seized as hereinafter described. The rolls 77 are driven by a gear train 79, driven by a countershaft 80 in any well known manner. This shaft is driven by gears 81 and a vertical shaft 82, which latter is driven by the main shaft 64, through a gear 83.

When the belt stops the article 67 is just under the paper feeding means resting on the lifting blocks as shown in Fig. 1 and in full lines in Fig. 2. This position is represented diagrammatically in Fig. 29. In order to permit operation of the paper conveyer it is necessary that the article be lifted into the position shown in dotted lines in Fig. 2. The first movement toward producing this effect is the indrawing of the package lifter, and, as this element is closely associated with the paper adjuster in my preferred machine, the two will be described together.

The preferred form of package lifter and paper adjuster is shown best in Figs. 3, 7 and 8. A sliding carriage 84 is carried upon horizontal guide bars 85. From the sides of the carriage 84 there extend two pins 86 embraced by forks 87 on the shifting lever 88. The position of the carriage and shifting lever when the belt first stops is shown in dotted lines in Fig. 3. The lever 88 is pivoted at 89 and has a pin 90 entering the groove 91 of the shifting cam 92. This cam is on the shaft 93 driven by the bevel gear 94 on the main shaft 64. A similar cam and shifting lever, operated by the shaft 95, is used on the opposite side of the machine for actuating the securing blades hereinafter described as a part of the paper adjuster. This mechanism, being merely the duplicate of that just described, is omitted to give room for a drawing of larger scale than would otherwise be possible.

The tension device, forming a part of the paper adjuster, comprises a tension body 96 on a sleeve 97, keyed to and sliding within the carriage 84. To this body are fixed the thin flat horizontal tension blades 98.

The package lifter comprises a lifting body 99 on a lifting stem 100, keyed to and sliding within the sleeve 97. To the body 99 is fixed the lifting cradle composed of the thin flat lifting blades 101, and steadying blades 102.

As soon as the article comes to rest in the position represented by Fig. 29, the cam 92 acts to draw in the blades 98, 101 and 102, by shifting the carriage 84 to the position shown in full lines in Fig. 3. At this time, as also shown in Fig. 3, the two bodies 96 and 99 are close together, as are their blades 98 and 101. At the same time the opposed shifter (not shown) carrying the securing blades 103, draws in said blades so that they occupy the position shown in Fig. 3. The condition of the package at this time is exemplified by Fig. 30.

It is to be understood that, as the blades are drawn inward toward the middle line of the machine as hitherto described, the lifting blades 101 slip under the article within the spaces between the lifting blocks 52, and these spaces also accommodate the blades 98 and 103.

The shaft 93 carries a gear 104, which drives the gear 105 on the shaft 106, to which are fixed the lifting cams 107, and 108. The lifting stem of the package lifter comprises an extension 109 bearing on the cam 107, and the sleeve 97 has a lifting stem 110 attached to it, whose end bears upon the cam 108.

As soon as the position exemplified in Fig. 30 is reached, the cam 107 acts to raise the body 99 and attached blades, thus lifting the article into the dotted line position in Fig. 2, as exemplified in Fig. 31. It is at this moment that the advancing edge of the wrapping paper is carried past the under side of the article and under the blades 101 by the paper conveyer which has in the meantime begun its cycle of operation, and whose action and construction will now be described.

The paper conveyer comprises a closed guiding track, preferably circular in form and composed of the two rails 111 and 112, upon which there travel the guiding wheels 113 of a conveyer carriage 114, having an adjustable extension 115, to which is pivoted a revoluble gripper disk 116. Fixed on the disk 116 is a gripping finger 117, and centrally pivoted thereon is a second finger 118. These fingers occupy different planes parallel to the disk 116 and carry the respective jaws 119 and 120 which overlap and are normally pressed together to grip anything placed between them by the spring 121 pressing against the tail of the finger 118.

A spring 122 is attached at one end to the carriage extension 115 and at the other to the disk, and this spring acts normally to maintain the disk and fingers in a position relative to the carriage shown in dotted lines in Fig. 4.

A driving gear 123, concentric with the rails 111 and 112 carries the carriage 114, and is driven by the main shaft through an appropriate gearing. In the form shown, this gearing comprises the pinions 124, 125, 126 and 127, the shaft 128, and the pinions 129 and 130 (see Fig. 2). This gearing is so calculated as to impart two full revolutions to the carriage 114 for each revolution of the main shaft 64. The supplemental guide wheels 131, fixed to the driving gear 123, serve to maintain the same in proper relation with the guide rails 111 and 112. The jaws 119 and 120, although broken off in Fig. 5, preferably extend across the machine and the means herein described for operating the same are duplicated on the two sides of the machine. Being alike on both sides these means are omitted on one side of the drawings, to save room.

In order to operate the gripper and cause it to seize the edge of the paper 132, I preferably employ two operating arms. One of these, shown at 133, called the "disk-operating arm," is pivoted at one end to the disk 116 at 134, and passes through a guide 135 on the driving gear 123. It carries a roller 136 at its outer end. The other arm is called the "finger-operating arm" and is shown at 137. It is pivoted at 138 to the rear extension of the pivoted finger 118, and passes through a guide 139 on the driving gear 123. It is provided with a roller 140 at its outer end. As clearly shown in Fig. 5, these operating arms lie in different planes parallel to the disk 116.

Swinging on a shaft 141 is a suitably shaped grip-operating rail 142, carrying at its extremity an offset operating rail 143. The rails 142 and 143 are respectively in the same plane with the arms 133 and 137. Inasmuch as it is only intended to cause the jaws 119 and 120 to grip a new piece of paper once for each two revolutions of the driving gear 123, a rail-shifter is provided which brings the rails into operative position (as shown in Fig. 4) at the proper moment for gripping the paper, while holding said rails out of operative position the remainder of the time; thus permitting the carriage 114 and arms 133 and 137 to pass the gripping point without opening the jaws, once every other revolution.

As shown in Figs. 1, 2 and 4 this rail shifter comprises a lever 144 moved by a rod 145 having a roller 146 which bears upon a cam 147 on the main shaft. This cam is suitably shaped to carry out the function last above described.

Referring to Fig. 4, it will be seen that, with the rails 142, 143 in operative position, as the carriage 114 comes under the paper 132, the arm 133 and roller 136 impinging upon the rail 142, the disk 116 is pushed around its pivot until it occupies the position shown in Fig. 4. Finally the roller 140 strikes the rail 143, and the finger 118 is so tilted as to separate the jaws 119 and 120. At this moment there comes into driving position that portion of the gear 126 which has missing teeth, as shown at 148 in Fig. 2, and, in consequence, the jaws, with the carriage 114, are arrested in the position shown in Fig. 4, and, as the paper 132, is being fed constantly, the edge of this paper is projected between the jaws 119 and 120 just far enough so that, as the carriage 114 starts again and the roller 140 leaves the rail 143, releasing the finger 118, the jaws snap shut upon the end of the paper. At this moment the paper is sheared by any appropriate cutter 149, operated in any well known manner, as by a cam 150 on the countershaft 80.

Any means whereby a suitable diminution in the speed of the carriage is caused at the proper time will answer the purpose, and in claiming means for creating a "pause" in the carriage movement, I intend to cover means for slowing up as well as for arresting this movement.

As soon as the paper is gripped, the gear 126 begins to operate again and the carriage resumes its circular movement. Both rollers 136 and 140 leave the operating rails, and the disk and fingers resume the position shown in dotted lines in Fig. 4. This brings the advancing edge of the paper close to the package 67, so that, just as the lifting of the package is accomplished, as above described, the fingers pass under it and draw the paper across beneath the blades 101.

As soon as the fingers have passed these blades, the tension cam 108 pushes up the tension device, and the tension blades 98 press the paper against the under side of the article 67, creating the proper tension to maintain proper smoothness in the advancing sheet. This phase of operation is exemplified in Fig. 32.

The fingers 117 and 118 then continue their orbital motion, drawing the sheet of paper of limited length after them, until said sheet assumes the position illustrated in Fig. 33, at which time the last element of the paper adjuster, namely the paper securing blades 103 come into play. As heretofore stated these are arranged to be pushed up by mechanism in all respects similar to that which raises the tension device, which mechanism is operated by the shaft 95 (see Fig. 3) in the same manner as shaft 93 operates the tension blades, but on the opposite side of the machine. This mechanism, being a mere duplication of what is shown in Fig. 3, is omitted in the drawing. Fig. 33 shows the relative position of the paper and the three sets of blades when the wide sheet has just been wrapped around the article, with the overlap under it.

Just as the position exemplified in Fig. 33 is reached the "releasing tripper" is brought into operation to open the jaws 119, 120, and release the paper. In the preferred form shown, this element consists of suitably shaped stops 151, 152, on opposite sides of the machine (see Fig. 3), which are lifted on rods 153 converging upon a lifting cam 154 on the main shaft. These stops, when so lifted are in the path of movement of the roller 140 on each side of the machine, and thus act to open the jaws 119, 120, as heretofore described with relation to the rail 143. As soon as the stops have released the paper, they drop back into inoperative position.

The fingers continue their progress toward the position shown in Fig. 4, for another operation, and in the meantime the cams 107 and 108, with the companion cam (not shown) in the opposite side of the machine, lower the blades 98, 101 and 103, so as to return the article 67 to its original position within the centering blocks; but now having the paper lapped around it as shown in Fig. 33. The cams 92 on opposite sides then act upon the sliding carriages to withdraw all the blades, and the article remains within the package holder in the condition exemplified in Fig. 34. The article is now ready to be shifted to the next main unit, or paper folding unit. This is accomplished by a quarter turn of the Geneva stop gear 59, as before described. It is to be understood, of course, that a new article to be wrapped is introduced into each unit, as the article just acted upon is withdrawn. This is indicated in Fig. 1.

It is an important advantage of my invention that the article to be wrapped, whatever its nature, is always maintained in an upright position, and, with this end in view the paper as first applied is lapped beneath the article, so as to be kept in place by the weight of the article within the package holder, as indicated in Fig. 35.

The preferred construction of the paper folding unit is illustrated in Figs. 1 and 15 to 19 inclusive. It comprises four principal secondary units, namely—the "steadying device," the "initial folder," the "side folder" and the "final folder." Where the article has sufficient stability, the "steadying device" may be omitted.

The specific form of "steadying device," herein shown comprises a pressing rod 155 upon which is loosely mounted a pressing plate 156, borne forward by a spring 157 whereby a predetermined yielding pressure may be applied to the article for steadying it. The upper end of the rod 155 is furnished with a pin 158, entering a suitably shaped groove in the pressing cam 159 on the shaft 80.

The initial folder comprises two vertical folding plates 160 adjustably fixed on opposite sides of the sliding carriage 161 furnished with a vertical sleeve 162, sliding within the guide 163, and surrounding the pressing rod 155. A stem 164, rises from the sleeve 162 and has a pin 165 entering a suitably shaped slot in the initial folder cam 166, also fixed on the shaft 80. As shown in Fig. 16, I prefer to carry the plates 160 on a slot and pin mounting 167, and to press them downward by a spring, 168, abutting on a pin 169.

As soon as the wrapped article 167 comes to rest within the scope of the folding unit, the cam 159 acts to press the plate 156 down upon it as exemplified in Fig. 35. A moment later, the cam 166 depresses the folding plates 160 which are adjusted to slip down against the ends of the article 67 and form the first fold in the projecting ends of the paper. This is shown in Fig. 36. As soon as the folds are formed the plates 160 are lifted.

The side folders, which are duplicated at the two sides of the machine, comprise the tilting folders, the preparing means, and the folding operators. The tilting folders comprise the folding levers 170 fixed to horizontal shafts 171 arranged to slide longitudinally within and to turn with the revoluble sleeves 172, mounted in fixed bearings 173. It is obvious that, as the wrapped article enters the folding unit, these levers 170 must occupy positions beyond the ends of the projecting paper 132, as shown in Fig. 15. After the article is in place, the levers are moved inward to folding position by causing the preparing means to slide the shafts 171 inward in their bearing sleeves 172. The two positions are shown in Fig. 18.

For this purpose the preparing means comprises forked preparing levers 174, on the shafts 175, which are caused to tilt inward by means of the arms 176, the rods 177, the stem 178, the pin 179 and the suitably grooved cam 180 on the shaft 64.

When the folding position is reached, as shown in dotted lines in Fig. 18, it becomes necessary to tilt the folding levers inward, one after the other, on each side of the machine, so as to produce the side folds as shown in Fig. 37. This is done by the "folding operators." I prefer to accomplish this by means of a "folding cam" on the shaft 64, and in the preferred form shown this cam is formed by an appropriate groove on the side of the cam body 181 (see Fig. 16). Within this groove there slides a pin 182 on a vertically guided stem 183, from which diverge the rods 184. These rods are pivoted to arms 185 on the revoluble sleeves 172, whereby movement of the pin 183 is transformed into the proper tilting movement of the levers 170. As shown in Figs. 16 and 18, the connection of one rod 184 on each side with its corresponding arm 185 is a pin and slot connection, so that this lever acts a moment later than the one opposed to it, thereby causing one side fold of paper to cover the other, as shown in Fig. 37. The folding levers, having formed these side folds are then tilted back preparatory to formation of the final fold.

This is formed by the "final folder," which in the preferred form shown comprises the folding flaps 186 pivoted on shafts 187 placed longitudinally of the machine in the relation to the article 67 shown in Figs. 15 and 38. The bearings 188 through which the shafts 187 pass are elongated as clearly shown in Fig. 19, and the shafts normally occupy the outer ends of said slots as shown in Fig. 15.

Each folding flap is provided with a suitable arm 189 to the outer end of each of which is pivotally attached one end of an operating rod 190. These rods converge to a vertically guided stem 191 having a pin 192 entering a suitable groove in the final folding cam. In the form shown the groove in question is cut in the outer face of the cam body 181, but this is not essential.

The final fold is formed at the proper moment after withdrawal of the side folding arms 170, by upward movement of the stem 191, caused by the final folding cam, and transmitted by the rods 190, so as to cause the flaps 186 to turn around the bearing shafts 187 into the vertical position shown in dotted lines in Fig. 19. Owing to the elongation of the slots at 188, the flaps 186 are given a final upward sliding movement over the paper folds, thereby producing a creasing effect which serves to aid in making these folds hold their form temporarily while the article moves toward the binding unit. The final position of the flaps is shown in Fig. 38.

As soon as this is accomplished, the final folding cam returns the flaps 186 to their normal position shown in full lines in Fig. 19. This leaves the article inclosed in the fully folded paper, as shown in Fig. 39. It is to be understood that, while I prefer to form all the necessary end folds while the article 67 is stationary, as above described, my broad invention is not limited to a machine in which all the folding actions are successively carried out without moving the article to be wrapped.

The return of the flaps 186 to their normal position occurs at about the same time that the paper applying operation is completed, in the first unit, and the conveyer then carries the unbound wrapped article to the binding unit. This unit may have any desired construction and may tie or bind the article in any one of many ways without departing from the scope of my broadest claims.

In the preferred form of my invention, one embodiment of which is illustrated herein, the binding unit comprises a ribbon conveyer, a tension device, and a gumming device, as secondary units. To these I prefer to add a package compressor, where it is intended to wrap loaves of bread or other articles or packages capable of compression. The preferred details of construction are best shown in Figs. 12, 13, 14, and 20 to 28 inclusive.

After the package comes to rest, with the last fold naturally slightly inclining outward, as shown in Fig. 21, the package compressor comes into action. In order to surely permit passage along the machine of the last paper folds, however much they may incline outward, I prefer to have that part of the compressor which comes in contact with the package normally occupy a depressed position. For this reason the compressor comprises a preparing means and a compressing mechanism.

The preparing means comprises, in its preferred form a lifting bar 193 carrying rods 194 at its outer ends, which rods are adapted to slide through guides 195. The rods 194 carry at their upper ends horizontal sleeves 196 through which slide the rods 197 normally held outward by springs 198 and carrying at their inner ends compression plates 199, each of which is preferably provided with a ribbon-guiding projection 200. The lifting bar 193 is supported on a stem 201 resting on a preparing cam 202 on the main shaft, whereby the sleeves and plates are lifted into operating position at the proper moment, as shown in Fig. 22. I prefer to use a spring 203 to draw the bar 193 downward, and keep the roller at the lower end of the stem 201 firmly in contact with the cam 202.

As soon as the preparing means just described have acted to bring the plates 199 to the proper level on each side of the article 6 7, the compressing mechanism proper, of which said plates and the rod 197 are a part, comes into play. The other portions of the compression mechanism are the compressing levers 204, pivoted at 205 and supplied with arms 206 to which are pivotally connected the compression rods 207. These rods converge upon a stem 208 to which they are pivoted, which stem is lifted at the proper time by the compressing cam 209, on the main driving shaft. This action causes the upper ends of the levers 204 to push the rods 197 inward from the two sides simultaneously, thus compressing the wrapped package between the plates 199, as shown in Figs. 22 and 40.

This compression is gaged by the nature of the package and the wrapping material. Its object is to subject these elements as a whole to such a pressure during the binding operation that, when the pressure is withdrawn the natural resilience of the entire package will cause it to swell within the ribbon, and thus insure this last being tightly and securely applied.

While the operations above described have been preparing the package for its binding, the ribbon conveyer has begun to operate. This secondary unit is preferably composed of a "ribbon feed," a "ribbon grip," a "grip carrier," a "guiding track," and "grip operators;" and the preferred details of construction of these parts are shown in Figs. 1, 12, 13, 14, 20, 21, 26 and 28.

The binding ribbon 210 is wound upon a roll 211, suitably supported on the machine frame. The feeding rollers 212 draw this ribbon from the roll and deliver it to the guide chute 213. The rollers 212 are driven in any appropriate manner and in Figs. 1 and 26 I have shown an inclined shaft 214 for this purpose furnished with bevel gears 215 and 216, the latter of which is driven by the gear 217 on the main driving shaft.

It is to be understood that, for purposes of convenience, Fig. 26 has been greatly shortened so as to bring the roll 211 much closer to the binding unit than it would be if the inclined shaft 214 were placed as shown in Fig. 1. The particular location of these parts is, of course, not essential.

The cutting of the ribbon at the proper moment to provide suitable lengths for each package is accomplished by suitable cutting mechanism 218 operated by a rod 219 whose movements are governed by a cutting cam 220 on the main shaft 64. The details of the cutting mechanism form no part of the present invention, and any automatic cutter of well known construction may be employed.

The ribbon grip is composed of a body 221 carrying a jaw 222 fixed to one side thereof and a second jaw 223 pivoted to the other side. The jaws are normally held together by a spring 224, and they may be opened by a tripping catch 225, operated as hereinafter described.

The grip carrier comprises a revoluble carrier body supporting a sliding frame upon which the grip body 221 is carried. The carrier body preferably comprises two horizontal hollow sockets 226, 227, united by a rod 228 and fixed to a vertical shaft 229 revolubly mounted in a bearing guide 230. The shaft 229 is driven by a pinion 231, meshing with a pinion 232 on the same shaft with a gear wheel 233, which last is driven by a pinion 234 on the counter-shaft 80.

The sliding frame comprises a U-shaped rod 235, whose parallel legs enter the sockets 226 and 227 and are normally pressed outward by the springs 236, 237 (see Fig. 14). The gripper above described is carried on a rod 238 depending from the outer lower corner of this frame, and a roller 239 on said frame bears constantly upon the guiding track 240. It will be clear from this description that, as the carrier body and frame are revolved together, the gripper carried by the latter will be caused to follow a path the shape of which is determined by the shape of the track 240. This shape is shown in its preferred form in Fig. 26 in dotted lines.

As the gripper reaches the position shown in Fig. 26, opposite the end of the ribbon emerging from the chute 213, the first "grip operator" comes into play. This element consists of a tripping stop 241 on the end of a tripping rod 242 commanded by a tripping cam 243 on the main shaft. This stop is lifted at the proper moment in the path of movement of the catch 225, and, striking the inclined surface thereof, it separates the jaws 222 and 223. At this moment there is a short pause in the movement of the gripper, due to omission of teeth at 244 in the driving gear 234; during which pause the extremity of the constantly moving ribbon 210 is projected between the jaws of the gripper (see Fig. 26).

As soon as a sufficient length of ribbon has been so projected, the travel of the gripper is continued, owing to the toothless portion of the gear 234 having passed the point of engagement with the pinion 233, and, the moment the catch 225 leaves the stop 241, the jaws close and grip the ribbon. Owing to the shape of the track 240, the gripper moves inward toward the article 67, and thereby draws the ribbon across the outer face of the compression plate 199, over the flat top of the guiding projection 200.

As soon as the gripper has passed the plate 199, the "tension device" comes into operation. In the preferred form shown, this device comprises the tension plate 245 placed on the end of the flat guiding stem 246, which stem is provided with guiding slots 247 sliding on pins 248, and preferably formed, as shown, so that, as the stem and plate move upward, they will have first an inward movement toward the package and then a vertical movement into final position.

The action of the tension plate is to keep the ribbon suitably taut and level in proper position with respect to the package, which is determined by the guiding projection 200 on the plate 199. (See Fig. 41). A similar projection 249 on the plate 245 acts as a guide for the second lap of the ribbon. The upward movement of the plate 245 is caused by the tension cam 250 on the main shaft, acting through a vertical stem 251 carrying an arm 252, to the outer end of which is pivoted the lower end of the guiding stem 246. The spring 253 acts to hold the stem 251 down on the cam 250.

After the operation just described, the gripper continues to travel around the package, drawing the ribbon along over the guide 200, under the tension plate 245, until the gripper again reaches about the position shown in Fig. 26, and the ribbon assumes the position shown in Fig. 12; at which time the gumming device comes into operation. It will be seen by the dotted line in Fig. 26 that, in the position shown, the gripper is about to move along an incurving portion of the guiding track, whereby said gripper approaches the package more nearly than before. The object of giving this form to the track is to make the gripper bring the ribbon around the package to form the overlap, without drawing said ribbon any farther along under the tension plate. The shape of the track should be so calculated that, as the gripper approaches the package 67 it will not relax the ribbon, but will simply cause it to close in upon the package, while under normal tension. At the same time the rear extreme of the ribbon is held under the tension plate. This condition is exemplified in Fig. 42, which also shows the position of the gum transfer arm while in action.

It is while the ribbon is thus stationary in that portion over the compressing plate 199 that the gumming device acts. This device may be of any well known character without departing from my invention, so long as it applies the gum and wipes the over-lap firmly over the gummed section of ribbon automatically. In the preferred form shown this element of the machine comprises two coöperating subordinate units; namely, the gum applying means and the wiping means for the overlap. These preferably have the following construction.

A gum reservoir 254 is placed near the gumming point as shown in Fig. 26, and a gumming band 255 passes over two rollers; one, shown at 256 being within the body of gum, the other, shown at 257 being above the reservoir. The latter is slowly revolved, so as to drive the band 255 and bring a new supply of gum out of the reservoir. This may be accomplished by any appropriate means, as, for instance, by a belt 258 driven from a pulley 259 on the main shaft.

The gum is placed upon the ribbon by a gum transfer arm 260, pivoted at 261, and furnished with a roller 262 at its extremity, which is normally in the position shown in Fig. 26. The operative movement of this arm is indicated by the arrow in Figs. 12 and 26 and the dotted line position in Fig. 12 shows how the gum is applied by the roller 262 to the rear extremity of the ribbon, or near it. The operative movement just referred to is produced by the gumming cam 263 on the main shaft, acting through a push rod 264, pivotally connected to a rearward extension, 265, of the arm 260.

The movement of the arm 260 is a simple back and forth movement through the required circular arc, whereby the gum-covered roller 262 is passed over a suitable length of the ribbon. In order to prolong the period of contact, the roller 262 is mounted upon an extension 266 movable on the arm 260, and pressed outward by the spring indicated in dotted lines in Fig. 12. It is, of course, within the spirit of my invention to so shape the gumming cam as to cause a repeated movement of the arm 260 for each gumming operation.

This operation is completed just before the gripper brings the forward end of the ribbon around over the guide 247 on the tension plate and over the gummed section of ribbon, to form the overlap. Just after the gripper passes said gummed section, the ribbon wiping means and the second grip operator come into play. These act practically simultaneously, but in such a manner that, when the ribbon is released by the gripper it finds a safe retaining agent in the wiping means. I, therefore, prefer that this latter means should operate just before action of the grip operator.

The wiping means preferably comprises a wiping arm 267, pivoted at 268 and carrying a wiping pad 269 at its extremity, which pad is spring mounted, as shown in Fig. 13, to extend the interval of contact with the ribbon and insure suitable firm yielding pressure. The arm 267 has an extension 270 to which is attached an operating rod 271, having a pin 272, entering a suitable groove in the face of the wiping cam 273. The action of the arm 267 and rod 271 is indicated by the arrows in Fig. 13, and is exemplified in Fig. 43. This element wipes the pad 269 firmly once forward upon the ribbon overlap, securing the same thereby to the previously gummed portion of the ribbon.

I prefer to arrange the wiping cam, in a well known manner, so that, after the forward wiping movement of the pad 269, the wiping arm does not return, until just after the package has been moved away from the binding unit.

The release of the ribbon is effected by means substantially like that already described for opening the jaws 222 and 223 in gripping the ribbon. The second tripping stop 274 is carried on a vertical rod 275, commanded by a tripping cam 276 on the main shaft through a tilting arm 277. The stop moves upward into the path of the tripping catch 225 on the gripper in time to cause the ribbon release, and it then drops back to normal position (see Figs. 20 and 21).

Finally the tension plate and the compression plates are withdrawn in that order each by a simple downward sliding motion, first, so that the fastening of the ribbon may not be disturbed. This is assured by the shape of the guiding slots 247 in Figs. 21 and 25, and by the appropriate action of the preparing cam 202 before release of the compressing levers 204. These latter are given an extended vertical pressing surface for this purpose, as shown in Figs. 21 and 22. The resilience of the package causes it to swell sufficiently when released to insure a tight hold of the ribbon whereby it will safely hold its proper position. The final condition of the package is shown in Fig. 44.

The three essential main units having thus been passed, the conveyer delivers the wrapped and bound package to the package receiving blades 72 over which it slides to the delivery chute 73, as shown at the extreme left in Fig. 1.

It will be obvious to those skilled in machine construction that the many elements combined in this machine may be arranged in a great variety of modified ways; and may, in many cases, be replaced by equivalents or modified forms, all without departure from the spirit of my invention and the scope of my claims. It is therefore to be understood that I do not limit myself to details of arrangement or construction save as specifically and explicitly set forth in my respective claims.

The binding and sealing apparatus herein shown and not claimed is shown and claimed in another pending application of mine filed as a division hereof.

What I claim is—

1. A package wrapping machine comprising in combination a paper applying unit adapted to bend a sheet around an article and cause the same to overlap, a folding unit separate from said applying unit and adapted to operate upon one article while said paper applying unit is acting upon another, and a conveyer adapted to convey articles from said paper applying unit to said folding unit, substantially as described.

2. A package wrapping machine comprising in combination a paper applying unit adapted to bend a sheet around an article and cause the same to overlap, a folding unit, a binding unit separate from the other two units named, a conveyer adapted to carry articles to said units successively in the order above named, and means for causing said units to act simultaneously upon different articles, substantially as described.

3. In a package wrapping machine, a paper applying unit adapted to draw an enveloping sheet around a package in combination with independent means for carrying a package into and out of the field of operation of said paper applying unit, substantially as described.

4. In a package wrapping machine, a package holder comprising centering blocks and lifting blocks, separated by suitable spaces; in combination with lifting mechanism having blades adapted to enter the spaces between said lifting blocks, substantially as described.

5. In a package wrapping machine, a flexible conveyer belt having thin metal plates at intervals thereon, centering blocks fixed upon said plates, and lifting blocks suitably separated and also fixed to said plates, substantially as described.

6. In a package wrapping machine, a conveyer comprising a package holder; in combination with means for bending a sheet around an article, and a package lifter adapted to lift said article and to return the same to said holder after operation of said bending means, substantially as described.

7. In a package wrapping machine, a conveyer comprising a package holder, a package lifter, means for bending a sheet around a package while lifted, and means adapted to cause said package lifter first to enter said holder, then to lift said package and finally, to lower said package, substantially as described.

8. In a package wrapping machine, a conveyer, comprising a package holder, in combination with a package lifter, adapted to lift an article from and then return the same to said holder, and means for bending a sheet of suitable material around said article with its ends overlapping under said article, substantially as described.

9. In a package wrapping machine, a conveyer, comprising a package holder, in combination with a lifting cradle having plates adapted to enter said package holder, means for raising and lowering said cradle, and means for bending a sheet of suitable material around said article with its ends overlapping under said article, substantially as described.

10. In a package wrapping machine, a package holder having spaced lifting blocks for supporting an article, a lifting cradle having blades adapted to move into said package holder between said blocks, and means for bending a sheet of suitable material around said article with its ends overlapping under said article, substantially as described.

11. In a package wrapping machine, a paper applying unit, comprising in combination a paper feeding means, a package lifter, and a paper conveyer adapted to carry a sheet around a portion of said package lifter while it is in action, substantially as described.

12. In a package wrapping machine, a paper applying unit, comprising in combination a paper feeding means, a paper conveyer, a reciprocating package lifter, and a paper adjuster adapted to follow the movement of said package lifter, substantially as described.

13. In the paper applying unit of a package wrapping machine, a paper conveyer comprising in combination, an orbital guiding track, a conveyer carriage movable thereon; a revoluble gripper arranged on said carriage between the carriage and its center of motion, grip fingers projecting from said disk, and means for revolving said disk, and fingers on said carriage, substantially as described.

14. In the paper applying unit of a package wrapping machine, a paper conveyer comprising in combination an orbital guiding track, a conveyer carriage movable thereon, a revoluble gripper disk arranged on said carriage between the carriage and its center of motion, grip fingers on said disk, means for revolving said disk on said carriage, and separate means for opening and for closing said fingers, substantially as described.

15. In the paper applying unit of a package wrapping machine, a paper conveyer comprising in combination, a guiding track, a conveyer carriage movable thereon, a revoluble gripper disk on said carriage, grip fingers on said disk, a disk operating arm, an operating rail therefor, a finger operating arm, and an operating rail therefor, substantially as described.

16. In the paper applying unit of a package wrapping machine, a paper conveyer comprising in combination, a pair of gripping fingers, means for normally closing the same, means for causing said fingers to move through a closed path, separate opening means for said fingers at two different points in their path, and means for causing each of said opening means to move separately into and out of operative positions, substantially as described.

17. In the paper applying unit of a package wrapping machine, a paper conveyer comprising in combination an orbitally movable conveyer carriage, a revoluble gripper disk on said carriage between the carriage and its center of motion, a finger fixed on the side of said disk, a second finger pivoted on the side of said disk, operating arms for said disk and pivoted finger respectively, and means adapted to actuate said arms, periodically for controlling said fingers, substantially as described.

18. In a package wrapping machine, a package lifter, a paper feed, gripping means, a carriage for said means, a device for imparting an orbital movement to said carriage and fingers around said package lifter, and means for causing periodic pauses in said orbital movement and simultaneously opening said gripping means, substantially as described.

19. In a package wrapping machine, a paper conveyer, comprising gripping fingers, and means for causing them to move in a closed orbit; in combination with means for supporting an article inside of the path of movement of the said fingers, means for delivering a wrapper of definite length to said fingers, and means for adjusting said wrapper against said article while supported as aforesaid, substantially as described.

20. In a package wrapping machine, a paper conveyer, comprising grip fingers, and means for causing them to move in a closed orbit; in combination with a package holder near the lower limit of said orbit, means for successively lifting an article from said holder to near the center of said orbit and returning the same to said package holder, means for delivering a wrapper of definite length to said fingers, and means for adjusting said wrapper against said article while supported as aforesaid, substantially as described.

21. In the paper applying unit of a package wrapping machine, a package lifter, comprising in combination, a lifting cradle, means for shifting the same horizontally back and forth, and means for raising and lowering the same, substantially as described.

22. In the paper applying unit of a package wrapping machine, a package lifter, comprising in combination thin horizontal lifting blades, means for shifting said blades horizontally back and forth, and means for raising and lowering the same, substantially as described.

23. In the paper applying unit of a package wrapping machine, a package lifter, comprising in combination a sliding carriage, shifting means therefor, a lifting body, a lifting cradle, carried thereby, and means for raising and lowering said body, substantially as described.

24. In the paper applying unit of a package wrapping machine, a package lifter, comprising in combination a sliding carriage, shifting means therefor, a lifting body, a lifting cradle carried thereby, and a fixed cam under said carriage while in one position, adapted to raise and lower said body, substantially as described.

25. In the paper applying unit of a package wrapping machine, a paper adjuster, comprising in combination, tension blades, means for shifting the same horizontally back and forth, and means for raising and lowering the same, substantially as described.

26. In the paper applying unit of a package wrapping machine, a paper adjuster, comprising in combination, tension blades, paper-securing-blades, means for producing successive horizontal and upward movement of said tension blades, and means adapted to operate automatically for producing successive horizontal and upward movement of said paper-securing-blades, substantially as described.

27. In the paper applying unit of a package wrapping machine, a combined package lifter, and paper adjuster, comprising in combination, a sliding carriage, two lifting bodies, each carrying horizontal blades and both mounted on said carriage, means for shifting said carriage horizontally, and means for raising and lowering said lifting bodies, substantially as described.

28. In the paper applying unit of a package wrapping machine, a combined package lifter and paper adjuster, comprising in combination a sliding carriage, two lifting bodies, each carrying horizontal blades, and both mounted on said carriage, means for shifting said carriage horizontally, and means for raising and lowering one of said lifting bodies after the other, substantially as described.

29. In the paper applying unit of a package wrapping machine, a combined package lifter and paper adjuster, comprising in combination, a sliding carriage, a package lifting body, having horizontal blades, and a lifting stem, a second body, having horizontal blades, and a sleeve surrounding said lifting stem, means for shifting said carriage horizontally, and two cams adapted to coöperate with said lifting stem and sleeve respectively for raising and lowering said bodies successively, substantially as described.

30. In the paper applying unit of a package wrapping machine, a combined package lifter and paper adjuster, comprising horizontal package lifting blades, horizontal tension blades, and horizontal paper-securing blades; in combination with means for causing back and forth horizontal movements of said blades in proper sequence, and means for raising and lowering said blades in proper sequence during the interval between horizontal movements thereof, substantially as described.

31. In the paper applying unit of a package wrapping machine, gripping fingers, means for causing the same to move in a circular orbit, comprising a circular driving gear, a package lifting device, means for projecting said device through the lower portion of said gear, and means for raising and lowering said device while so projected through said gear, substantially as described.

32. In the paper applying unit of a package wrapping machine, gripping fingers, means for causing the same to move in a circular orbit, comprising a circular driving gear, a package lifting device, means for projecting said device through the lower portion of said gear; and means for raising and lowering said device while so projected through said gear; paper tension blades, and means for actuating the same, substantially as described.

33. In the paper applying unit of a package wrapping machine, gripping fingers, means for causing the same to move in a circular orbit, comprising a circular driving gear, a package lifting device, means for projecting said device through the lower portion of said gear, paper tension blades, paper securing blades, and means for actuating said tension and securing blades, substantially as described.

34. In a package wrapping machine, a package lifter, comprising a lifter body, adjustable side blades thereon, lifting blades fixed to said body, automatic means for causing up and down motion of said blades and automatic means for causing reciprocating movement thereof in the horizontal plane, substantially as described.

35. In a package wrapping machine, a paper tension device, comprising a body having horizontal blades, and a depending sleeve; in combination with a lifting body, having a lifting stem passing through said tension device, and carrying lifting blades, substantially as described.

36. In a package wrapping machine, a paper conveyer comprising gripping fingers, means for imparting orbital movement thereto, a package conveyer arranged to carry packages through the lower part of the orbit of said fingers. a package lifter, means for moving said lifter horizontally into said orbit of motion, and means for moving said lifter up and down while within said orbit, substantially as described.

37. In the folding unit of a package wrapping machine, the combination of an initial folder, a side folder, a final folder, a separately movable steadying device comprising a loosely mounted presser plate and a spring behind the same for accommodating packages of different height, automatic means for causing proper successive movements of said folders, and automatic means for causing said steadying device to move into and out of operative position, substantially as described.

38. In a package wrapping machine, a package lifter adapted to lift an article, means for bending a sheet around the article when lifted and a conveyer adapted to remove the article from the field of action of said lifter.

39. In a package wrapping machine, an initial folder, comprising a sliding carriage, vertical folding plates, mounted for slight vertical play on said carriage, a spring tending to thrust said plates downward, and means for lowering and raising said carriage and plates, substantially as described.

40. In a package wrapping machine, an initial folder, comprising folding plates, a body upon which they are mounted, and a sleeve on said body; in combination with a steadying plate, having a stem adapted to slide in said body, cams, and mechanical connections between said body and steadying plate respectively, and said cams, for producing successive movement of said body and steadying plate, substantially as described.

41. In a package wrapping machine, a side folder comprising tilting folders. preparing means adapted automatically to bring said tilting folders into a position preliminary to operation, and folding operators adapted to tilt said folders when so brought into position, substantially as described.

42. In a package wrapping machine, a side folder comprising pairs of tilting folders adapted to swing in parallel vertical planes, means for moving said folders back and forth at right angles to said planes, and folding operators for finally actuating said tilting folders, substantially as described.

43. In a package wrapping machine, a side folder, comprising pairs of tilting folders mounted for inward and outward horizontal movement, in combination with folding operators, adapted to actuate one of each pair of said tilting folders after the other, substantially as described.

44. In a package wrapping machine, a side folder, comprising revoluble sleeves, shafts slidable in said sleeves and adapted to turn therewith, folding levers on said shafts, preparing levers engaging said shafts, means for actuating said preparing levers, and means for revolving said sleeves, substantially as described.

45. In a package wrapping machine, a conveyer, means for stopping and starting the same, a side folder adapted to move operatively parallel to said conveyer, a final folder, and automatic means adapted to operate while said conveyer is at rest, for causing said folders to operate successively in the order named, substantially as described.

46. In a package wrapping machine, a final folder, comprising shafts, folding flaps, having elongated bearings on said shafts, and means for revolving said flaps and impelling them upward on said elongated bearings, substantially as described.

47. In a package wrapping machine, a final folder, comprising folding flaps, mounted so as to be capable of a swinging and a sliding movement, in combination with means for first swinging said flaps upward and then imparting to them a sliding movement in their own planes, substantially as described.

48. In the folding unit of a package wrapping machine, a conveyer and a final folder comprising a shaft parallel to said conveyer, a flap mounted thereon so as to be adapted to swing upward above the level of said conveyer, said flap having an arm, a cam and a mechanical connection between said cam and arm whereby said flap is caused to swing around said shaft periodically, substantially as described.

49. A package wrapping machine comprising in combination a holder adapted to support a package in a fixed position, a paper-applying unit adapted to bend a sheet around said article while the latter is stationary, a folding unit separate from said applying unit, and a conveyer adapted to carry said article with its holder from said applying unit to said folding unit, substantially as described.

50. A package wrapping machine, comprising in combination a conveyer for packages, a paper applying unit composed of movable elements all of which are independent of said conveyer, a folding unit separate from said paper applying unit, and means for causing said conveyer to carry packages from said paper applying unit to said folding unit, substantially as described.

51. A package wrapping machine, comprising in combination a conveyer for packages, a paper applying unit composed of moving parts all of which are independent of said conveyer, and a folding unit, substantially as described.

52. In a package wrapping machine, a paper applying unit comprising means for gripping an enveloping sheet, means for moving the same in an orbit of materially greater diameter than that of the average size of articles to be wrapped, and means for supporting the article within the scope of movement, of said sheet, substantially as described.

53. In a package wrapping machine, a paper applying unit comprising means adapted to grip the edge of an enveloping sheet and to carry the same orbitally around the article to be wrapped; in combination with elements adapted to move in opposite directions toward said article to support it within the orbit of movement of said sheet, substantially as described.

54. In a package wrapping machine adapted to move toward an article from opposite sides and to support it in wrapping position, means adapted to draw a sheet forward and back around said article, and automatic means for causing said supporting and sheet-moving means to move in appropriate sequence.

55. In a package wrapping machine, means for drawing a sheet forward and back, means for lifting an article across the path of movement of said sheet-moving means, and means for removing the article from the field of action of the means aforesaid.

In testimony whereof, I affix my signature, in presence of two witnesses.

ALBERT J. HADERT.

Witnesses:
H. S. MacKaye,
Katharine C. Mead.